(12) United States Patent
Fushimi et al.

(10) Patent No.: US 12,498,276 B2
(45) Date of Patent: Dec. 16, 2025

(54) PROCESS ESTIMATION SYSTEM, PROCESS DATA ESTIMATION METHOD, AND RECORDING MEDIUM

(71) Applicant: Tokyo Electron Limited, Tokyo (JP)

(72) Inventors: Naoshige Fushimi, Nirasaki (JP); Hidefumi Matsui, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 694 days.

(21) Appl. No.: 17/759,638

(22) PCT Filed: Jan. 27, 2021

(86) PCT No.: PCT/JP2021/002898
§ 371 (c)(1),
(2) Date: Jul. 28, 2022

(87) PCT Pub. No.: WO2021/157453
PCT Pub. Date: Aug. 12, 2021

(65) Prior Publication Data
US 2023/0115637 A1 Apr. 13, 2023

(30) Foreign Application Priority Data
Feb. 7, 2020 (JP) ................................. 2020-020129

(51) Int. Cl.
*G01K 13/02* (2021.01)
*G01K 7/42* (2006.01)
(Continued)

(52) U.S. Cl.
CPC ............. *G01K 13/02* (2013.01); *G01K 7/427* (2013.01); *G05B 23/02* (2013.01); *G06F 30/10* (2020.01);
(Continued)

(58) Field of Classification Search
CPC ........ G01K 13/02; G01K 7/427; G05B 23/02; G06F 30/10; G06F 2119/08; H01L 21/00; H01L 21/02; H01L 21/31
See application file for complete search history.

(56) References Cited

U.S. PATENT DOCUMENTS 5,386,373 A * 1/1995 Keeler ............... G01N 33/0075
700/266
6,618,856 B2 * 9/2003 Coburn ..................... G06F 8/44
703/22
(Continued)

FOREIGN PATENT DOCUMENTS

JP 2007507888 A 3/2007
JP 2009049305 A 3/2009
(Continued)

*Primary Examiner* — Laura Martin
*Assistant Examiner* — Philip L Cotey
(74) *Attorney, Agent, or Firm* — Armstrong Teasdale LLP

(57) ABSTRACT

Provided are a process estimation system and a process data estimation method for appropriately estimating process data, and a program. The process estimation system includes: an input part configured to input actual sensor data detected by a sensor of a substrate processing apparatus; a virtual sensor data generation part configured to generate virtual sensor data for a virtual sensor based on the actual sensor data and a physical model; and a process data estimation part configured to estimate process data based on the virtual sensor data.

13 Claims, 9 Drawing Sheets

(51) Int. Cl.
   *G05B 23/02* (2006.01)
   *G06F 30/10* (2020.01)
   *H01L 21/00* (2006.01)
   *H01L 21/02* (2006.01)
   *H01L 21/31* (2006.01)
   *G06F 119/08* (2020.01)

(52) U.S. Cl.
   CPC .............. *H01L 21/00* (2013.01); *H01L 21/02* (2013.01); *H01L 21/31* (2013.01); *G06F 2119/08* (2020.01)

(56) References Cited

U.S. PATENT DOCUMENTS

| | | | | |
|---|---|---|---|---|
| 7,305,322 | B2 * | 12/2007 | Funk | G01R 31/307 702/155 |
| 8,014,991 | B2 * | 9/2011 | Mitrovic | G06F 30/23 700/121 |
| 8,036,869 | B2 * | 10/2011 | Strang | G05B 19/41885 700/121 |
| 8,050,900 | B2 * | 11/2011 | Mitrovic | H01L 22/20 700/121 |
| 10,140,394 | B2 * | 11/2018 | Kommisetti | G06F 30/20 |
| 10,424,520 | B1 * | 9/2019 | Sasaki | H01L 22/26 |
| 10,937,637 | B2 * | 3/2021 | Iliopoulos | H01J 37/244 |
| 2003/0003607 | A1 * | 1/2003 | Kagoshima | H01J 37/32935 118/712 |
| 2005/0071035 | A1 * | 3/2005 | Strang | G05B 19/41885 700/121 |
| 2005/0071037 | A1 * | 3/2005 | Strang | G05B 19/41885 700/121 |
| 2005/0071038 | A1 * | 3/2005 | Strang | G06F 30/23 700/121 |
| 2005/0071039 | A1 * | 3/2005 | Mitrovic | H01L 22/20 700/121 |
| 2006/0166501 | A1 * | 7/2006 | Kaushal | C23C 16/45527 438/685 |
| 2009/0307163 | A1 * | 12/2009 | Jang | G01B 11/0683 702/170 |
| 2010/0198556 | A1 * | 8/2010 | Kost | G05B 23/0221 702/183 |
| 2020/0111689 | A1 * | 4/2020 | Banna | G05B 13/0265 |

FOREIGN PATENT DOCUMENTS

| | | |
|---|---|---|
| JP | 4789277 B2 | 10/2011 |
| JP | 2015018879 A | 1/2015 |

* cited by examiner

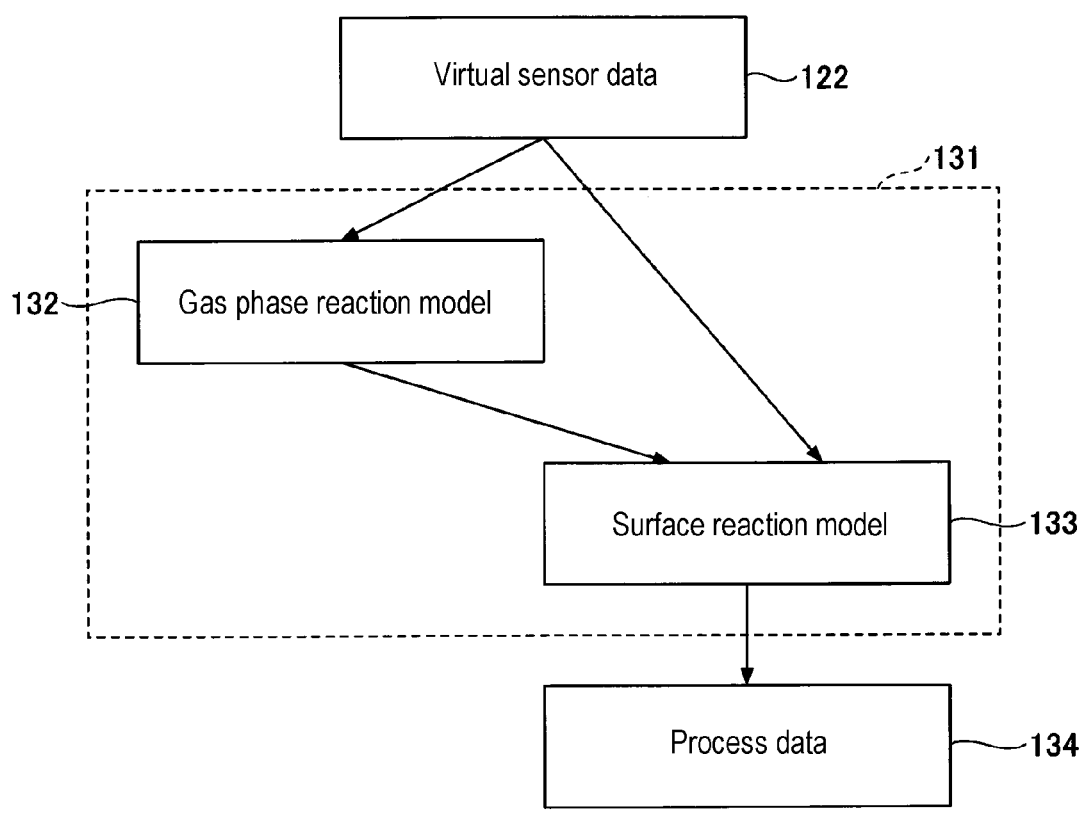

PROCESS ESTIMATION SYSTEM, PROCESS DATA ESTIMATION METHOD, AND RECORDING MEDIUM

CROSS-REFERENCE TO RELATED APPLICATIONS

The present application is a U.S. National Stage Entry of International Patent Application No. PCT/JP2021/002898, filed Jan. 27, 2021, which claims the benefit of priority to Japanese Patent Application No. 2020-020129, filed Feb. 7, 2020, each of which is hereby incorporated herein by reference in its entirety.

TECHNICAL FIELD

The present disclosure relates to a process estimation system, a process data estimation method, and a non-transitory computer-readable recording medium.

BACKGROUND

In a substrate processing apparatus that supplies a desired gas into a processing container and performs a desired process (e.g., a film forming process) on a substrate placed on a stage provided inside the processing container, there is a demand for a process estimation system that estimates process data such as a film formation amount.

Patent Document 1 discloses a plant operation support device that modifies a simulation model as needed based on actual data and performs a simulation in parallel with the operation of the actual plant in real time, whereby a state of the actual plant can be sequentially reflected in the simulation model and the operation of the actual plant can be predicted with high accuracy.

PRIOR ART DOCUMENT

Patent Document

Patent Document 1: Japanese Patent No. 4789277

In an aspect, the present disclosure provides a process estimation system and a process data estimation method for appropriately estimating process data, and a non-transitory computer-readable recording medium.

SUMMARY

In order to solve the above-described problems, according to an aspect, there is provided a process estimation system including: an input part configured to input actual sensor data detected by a sensor of a substrate processing apparatus; a virtual sensor data generation part configured to generate virtual sensor data for a virtual sensor based on the actual sensor data and a physical model; and a process data estimation part configured to estimate process data based on the virtual sensor data.

According to an aspect, it is possible to provide a process estimation system and a process data estimation method for appropriately estimating process data, and a non-transitory computer-readable recording medium.

BRIEF DESCRIPTION OF DRAWINGS

FIG. 5 is a schematic view illustrating an example of a reaction model used in a process data estimation part.

DETAILED DESCRIPTION

Figure 1:
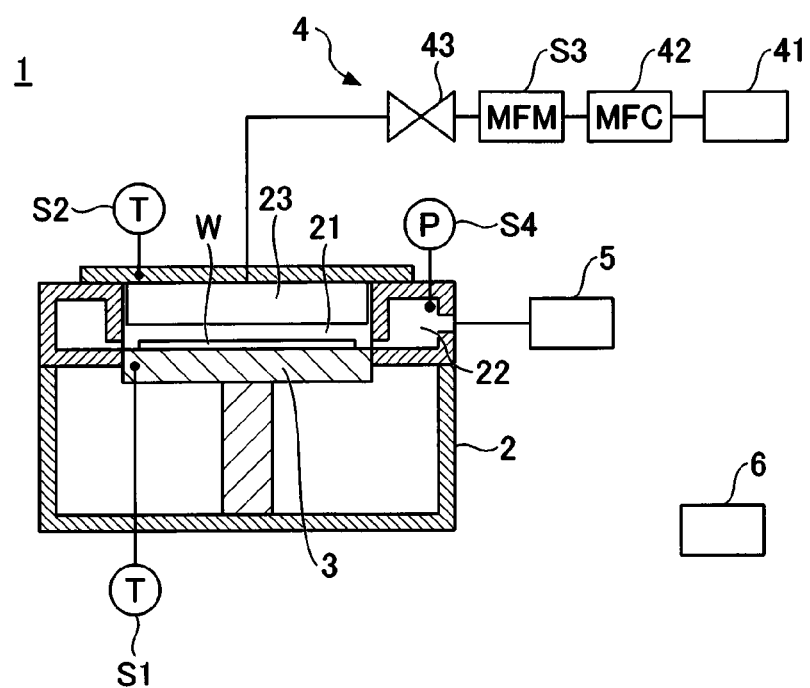
FIG. 1 is a schematic cross-sectional view illustrating an example of a substrate processing apparatus.

Hereinafter, embodiments of the present disclosure will be described with reference to the accompanying drawings. In each of the drawings, the same components will be denoted by the same reference numerals, and redundant descriptions thereof may be omitted.

[Substrate Processing Apparatus]

First, a substrate processing apparatus 1 for performing a desired process (e.g., a film forming process) on a substrate W such as a wafer will be described with reference to FIG. 1. FIG. 1 is a schematic cross-sectional view illustrating an example of the substrate processing apparatus 1.

The substrate processing apparatus 1 includes a chamber 2, a stage 3, a gas supply device 4, an exhaust device 5, and a control device 6.

The chamber 2 is divided into a processing space 21 and an exhaust space 22. The stage 3 on which a substrate W is placed is provided below the processing space 21. A shower head 23 that supplies a gas into the processing space 21 is provided above the processing space 21.

The gas supply device 4 includes a gas source 41, a mass flow controller 42, and an opening/closing valve 43, and supplies a gas to the shower head 23. The exhaust device 5 exhausts the gas from the exhaust space 22 of the chamber 2.

The stage 3 is provided with a temperature sensor S1 for measuring a temperature of the stage 3. The chamber 2 is provided with a temperature sensor S2 for measuring a temperature of a wall of the chamber 2. In addition, the gas supply device 4 is provided with a flow rate sensor S3 for measuring a flow rate of the gas supplied to the chamber 2. Furthermore, the chamber 2 is provided with a pressure sensor S4 for detecting a pressure in the exhaust space 22.

The substrate processing apparatus 1 illustrated in FIG. 1 is not provided with, for example, a temperature sensor that directly detects the temperature of the substrate W, a temperature sensor that directly detects a temperature of the gas inside the processing space 21, a temperature sensor that directly detects a temperature of each part of the chamber 2 (e.g., the shower head 23), and a pressure sensor that directly detects the pressure of the gas inside the processing space 21.

The substrate processing apparatus 1 may be provided with a temperature adjustment mechanism (not illustrated). For example, a heater (not illustrated) may be provided on the wall of the chamber 2. The stage 3 may be provided with a heater (not illustrated). The stage 3 may be provided with a flow path (not illustrated) through which a heat transfer medium such as brine passes. The substrate processing apparatus 1 may include a plasma generation device that applies a voltage between an upper electrode (the shower head 23) and a lower electrode (the stage 3) to generate plasma of the gas supplied from the shower head 23 to the processing space 21. In this case, a feeding line (not illustrated) to which the voltage is applied may be provided with a voltmeter (a voltage sensor) and/or an ammeter (a current sensor). An observation window (not illustrated) may be provided in the chamber 2, and an emission spectroscopic analyzer (not illustrated) for detecting the emission intensity of plasma through the observation window may be provided as a sensor.

The control device 6 controls the gas supply device 4, the exhaust device 5, and the like. As a result, the substrate processing apparatus 1 may perform the desired process on the substrate W placed on the stage 3.

For example, in a case in which the substrate processing apparatus 1 is a film forming apparatus that performs a film forming process on the substrate W, the gas supply device 4 supplies a precursor gas (e.g., $SiH_4$, $Si_2H_6$) from the shower head 23 into the processing space 21. In the precursor gas within the processing space 21, a decomposition reaction (a gas phase reaction) occurs. Some of the precursor gas is adsorbed on a surface of the substrate W. The rest of the precursor gas is exhausted from the processing space 21 by the exhaust device 5 via the exhaust space 22. The gas supply device 4 supplies a reaction gas (e.g., $NH_3$) from the shower head 23 into the processing space 21. As a result, the precursor adsorbed on the surface of the substrate W reacts, and a film (e.g., a SiN film) forming process is performed on the surface of the substrate W.

[Process Estimation System]

Figure 2:
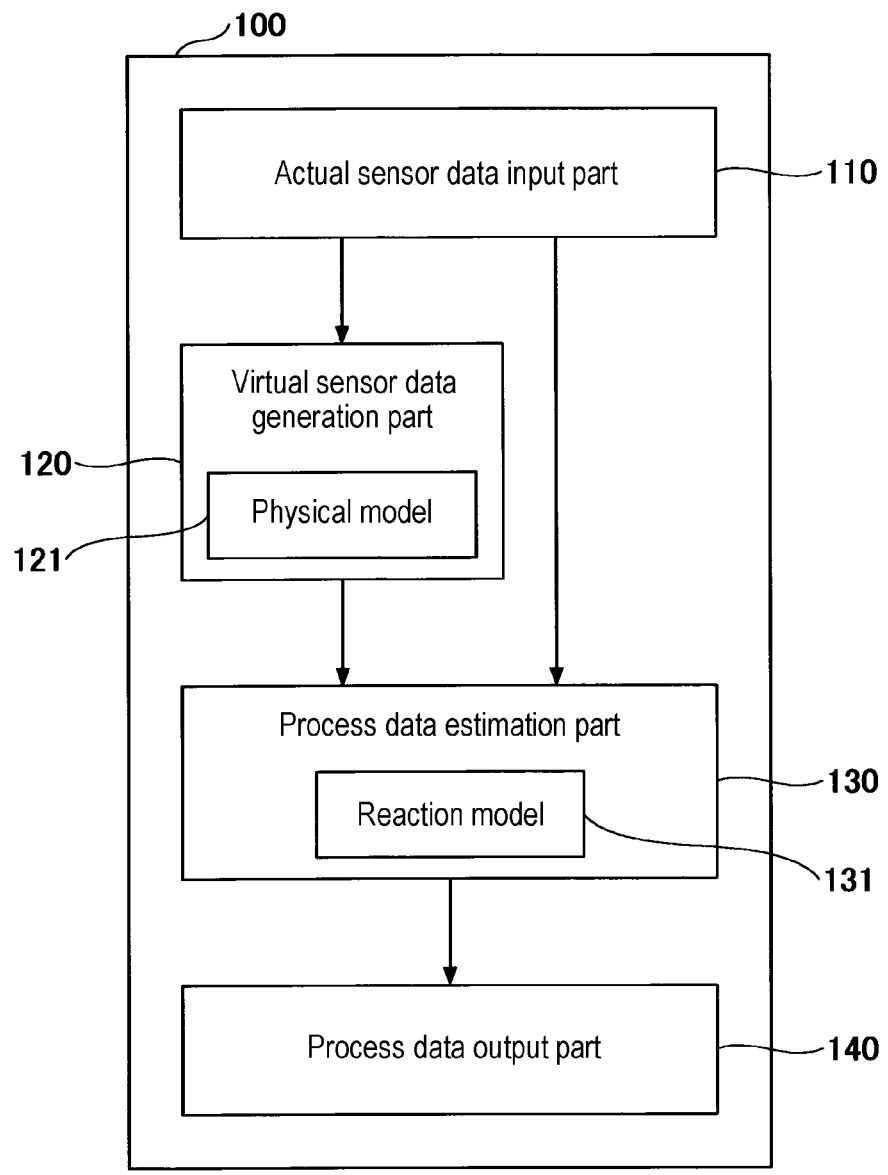
FIG. 2 is a configuration view illustrating an example of a process estimation system according to a first embodiment.

Next, a process estimation system 100 according to a first embodiment will be described with reference to FIG. 2. FIG. 2 is a configuration view illustrating an example of the process estimation system 100 according to the first embodiment. The process estimation system 100 estimates process data based on the detection values of respective sensors S1 to S4 of the substrate processing apparatus 1. Here, it is assumed that the substrate processing apparatus 1 is a film forming apparatus that performs a film forming process on a substrate W, and a case in which the process data is a film formation amount (deposition rate) will be described as an example. The process estimation system 100 may be mounted on, for example, the control device 6 of the substrate processing apparatus 1.

The process estimation system 100 includes an actual sensor data input part 110, a virtual sensor data generation part 120, a process data estimation part 130, and a process data output part 140.

Actual measurement data of respective sensors S1 to S4 of the substrate processing apparatus 1 is input to the actual sensor data input part 110. A log (e.g., a heat input or the like) of the temperature adjustment mechanism (not illustrated) may be input to the actual sensor data input part 110.

The virtual sensor data generation part 120 generates data of a virtual sensor based on the actual sensor data and the physical model 121. Here, the virtual sensor is a virtual sensor that detects a physical quantity of a measurement point where no sensor is provided in the substrate processing apparatus 1. For example, the virtual sensor may include a temperature sensor that detects the temperature of the substrate W, a temperature sensor that detects the temperature of the shower head 23, a temperature sensor that detects the temperature of the gas inside the processing space 21, a pressure sensor that detects the pressure of the gas inside the processing space 21, and the like. In the present application, generating a value of the virtual sensor by the virtual sensor data generation part 120 is also referred to as detecting a value by the virtual sensor.

Figure 3:
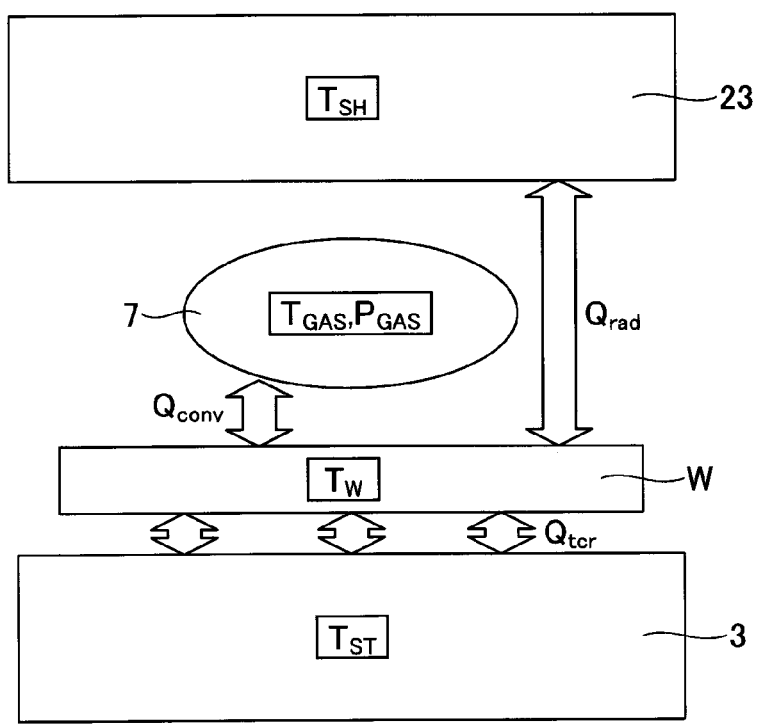
FIG. 3 is a schematic view illustrating an example of a physical model used in a virtual sensor data generation part.

FIG. 3 is a schematic view illustrating an example of the physical model 121 used in the virtual sensor data generation part 120. Here, the temperature sensor that detects the temperature of the substrate W will be described as an example of the virtual sensor. A thermo-fluid model is used as the physical model 121.

Here, it is assumed that a detection temperature of the temperature sensor (virtual sensor) which detects the temperature of the substrate W is $T_W$, a detection temperature of the temperature sensor (virtual sensor) which detects the temperature of the shower head 23 is $T_{SH}$, a detection temperature of the temperature sensor (virtual sensor) which detects the temperature of the gas inside the processing space 21 is $T_{GAS}$, a detection pressure of the pressure sensor (virtual sensor) which detects the pressure of the gas inside the processing space 21 is $P_{GAS}$, and a detection temperature of the temperature sensor S1 that detects the temperature of the stage 3 is $T_{ST}$.

Heat $Q_{rad}$ due to radiation from the shower head 23 to the substrate W may be expressed by Equation (1) using a constant σ, a heat transfer area A, and an emissivity ε. Heat $Q_{conv}$ due to convection from the gas 7 inside the processing space 21 to the substrate W may be expressed by Equation (2) using a heat transfer coefficient $h_{conv}$ due to convection and a heat transfer area A. Heat $Q_{tcr}$ due to the contact heat transfer from the stage 3 to the substrate W may be expressed by Equation (3) using a heat transfer coefficient h and a heat transfer area A. In addition, a temperature change of the substrate W may be expressed by Equation (4) using a heat capacity C of the substrate W.

$$Q_{rad} = \sigma A \varepsilon (T_{SH}^4 - T_W^4) \quad (1)$$

$$Q_{conv} = h_{conv} A (T_{GAS} - T_W) \quad (2)$$

$$Q_{tcr} = hA(T_{ST} - T_W) \quad (3)$$

$$\frac{dT_W}{dt} = \frac{Q_{rad} + Q_{conv} + Q_{tcr}}{C_W} \quad (4)$$

In this way, the virtual sensor data generation part 120 generates the detection temperature $T_W$ of the temperature sensor (virtual sensor) that detects the temperature of the substrate W based on the physical model 121. Similarly, based on the physical model 121, the virtual sensor data generation part 120 also generates each of the detection temperature $T_{SH}$ of the temperature sensor (virtual sensor) that detects the temperature of the shower head 23, and the detection temperature $T_{GAS}$ of the temperature sensor (virtual sensor) that detects the temperature of the gas inside the processing space 21, and the detection pressure $P_{GAS}$ of the pressure sensor (virtual sensor) that detects the pressure of the gas inside the processing space 21. In other words, the virtual sensor data generation part 120 generates virtual sensor values (virtual sensor data) based on the actual measurement data of respective sensors S1 to S4 of the substrate processing apparatus 1 input by the actual sensor data input part 110 and the physical model 121.

Figure 4A:
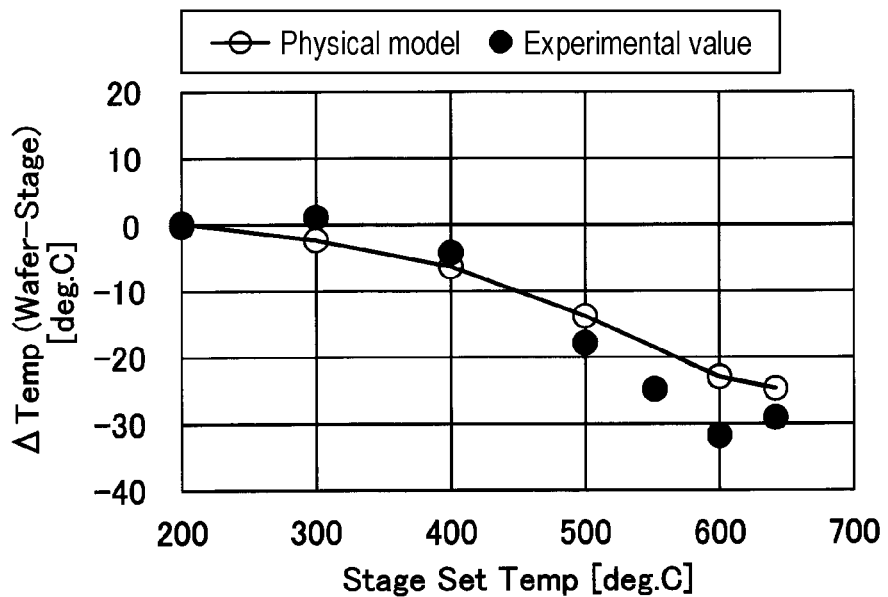
FIG. 4A is an example of a graph comparing results of a physical model with experimental values.
Figure 4B:
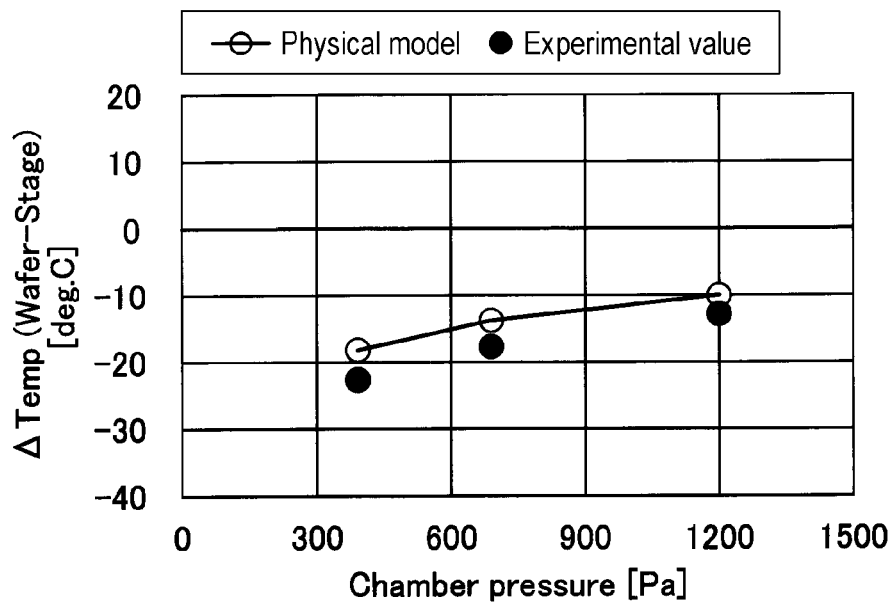
FIG. 4B is an example of a graph comparing results of a physical model with experimental values.

FIGS. 4A and 4B are examples of graphs comparing the results of the physical model 121 with experimental values.

FIG. 4A shows a temperature dependence of a temperature difference between the substrate W and the stage 3 when the pressure of the processing space 21 was set to constant (700 Pa) and the temperature of the stage 3 was changed. FIG. 4B shows a pressure dependence of the temperature difference between the substrate W and the stage 3 when the temperature of the stage 3 was set to be constant (500 degrees C.) and the pressure of the processing space 21 was changed. The results of the physical model 121 are indicated by white circles and solid line graphs, and the experimental values are indicated by black circles.

As shown in FIGS. 4A and 4B, the results of the physical model 121 reproduce the tendency of the temperature difference between the substrate W and the stage 3 with respect to the temperature of the stage 3 and the pressure of the processing space 21. That is, the virtual sensor data generated by the virtual sensor data generation part 120 appropriately reproduces the tendency of actually-measured values.

Returning back to FIG. 2, the process data estimation part 130 estimates process data (film formation amount, film formation rate) based on the virtual sensor data and the reaction model 131. Here, the virtual sensor data generated by the virtual sensor data generation part 120 is input to the process data estimation part 130. The process data estimation part 130 may be configured to estimate the process data based on the actual sensor data, the virtual sensor data, and the reaction model 131. That is, the data (actual sensor data, virtual sensor data) to be used may be selected according to the reaction model 131 of the process data to be estimated.

FIG. 5 is a schematic view illustrating an example of the reaction model 131 used in the process data estimation part 130. The reaction model 131 includes a gas phase reaction model 132 and a surface reaction model 133.

The gas phase reaction model 132 estimates a decomposition amount of a precursor gas inside the processing space 21 based on a gas pressure (virtual sensor data) and a gas temperature (virtual sensor data) inside the processing space 21.

The surface reaction model 133 estimates, as process data 134, an adsorption amount of the precursor gas adsorbed on the surface of the substrate W, in other words, a thickness (deposition rate) of a film formed on the surface of the substrate W, based on the decomposition amount of the precursor gas estimated by the gas phase reaction model 132 and the temperature (virtual sensor data) of the substrate W.

Figure 6A:
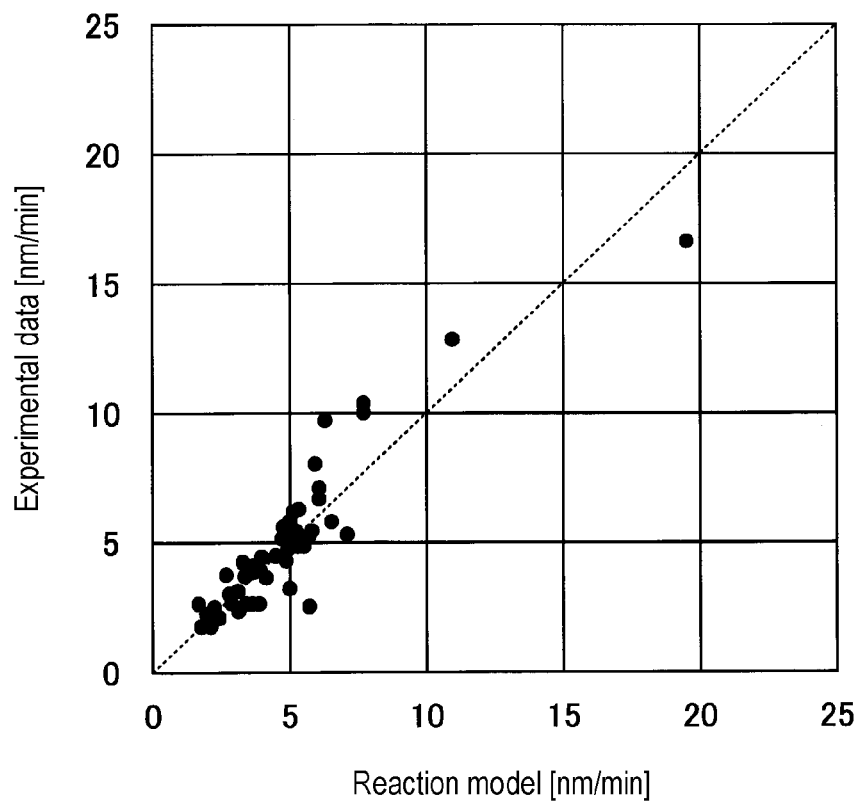
FIG. 6A is an example of a graph comparing results of a reaction model with experimental values.
Figure 6B:
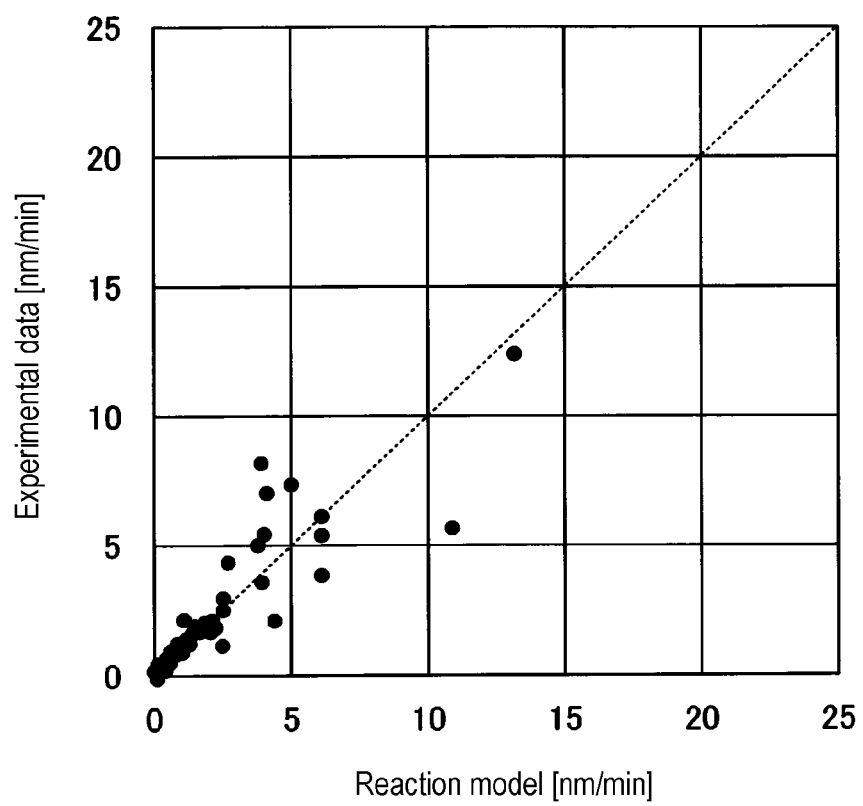
FIG. 6B is an example of a graph comparing results of a reaction model with experimental values.

FIGS. 6A and 6B are examples of graphs comparing the results of the reaction model 131 with experimental values. FIG. 6A shows a case in which a $SiH_4$ gas was used as the precursor gas. FIG. 6B shows a case in which a $Si_2H_6$ gas was used as the precursor gas. Here, the horizontal axis represents a film formation rate estimated by the reaction model 131, and the vertical axis represents a film formation rate based on an actually measured value.

A recipe of the substrate processing apparatus 1 in FIG. 6A is represented below.
Film formation time: 120 to 600 sec
Pressure inside the processing space 21: 9 to 40 Torr
Temperature of substrate W: 550 to 600 degrees C.
Flow rate of $SiH_4$+Ar: 120 to 9,040 sccm
Fraction of $SiH_4$: 0.01 to 0.75
Gap (the width of the gap from the processing space 21 to the exhaust space 22): 6 to 20 mm A recipe of the substrate processing apparatus 1 in FIG. 6B is represented below.
Film formation time: 180 to 1,800 sec
Pressure inside the processing space 21: 9 to 40 Torr
Temperature of substrate W: 400 to 530 degrees C.
Flow rate of $Si_2H_6$+Ar: 120 to 18,000 sccm
Fraction of $Si_2H_6$: 0.002 to 0.75
Gap (the width of the gap from the processing space 21 to the exhaust space 22): 6 to 30 mm In the example shown in FIG. 6A, the determination coefficient $R^2 \approx 0.85$. In the example shown in FIG. 6B, the determination coefficient $R^2 \approx 0.82$. That is, it was confirmed that the correlation between the process data (deposition amount, film formation rate) estimated by the process data estimation part 130 and the process data of experimental values (deposition amount, film formation rate) corresponds to the determination coefficient $R^2$ of more than 0.8. That is, the process data (deposition amount, film formation rate) estimated by the process data estimation part 130 appropriately reproduces the tendency of actually measured values.

Returning back to FIG. 2, the process data output part 140 outputs the process data estimated by the process data estimation part 130.

As described above, with the process estimation system 100 according to the first embodiment, it is possible to appropriately generate the virtual sensor data based on the actual sensor data detected by respective sensors S1 to S4 of the substrate processing apparatus 1 and the physical model 121. In addition, with the process estimation system 100, it is possible to appropriately estimate the process data (deposition amount, film formation rate) based on the generated virtual sensor data and the reaction model 131.

Furthermore, with the process estimation system 100 according to the first embodiment, the virtual sensor data is generated. This allows the virtual sensor data to be used for factor analysis of process results.

With the process estimation system 100 according to the first embodiment, it is possible to appropriately estimate the process data even under process conditions outside the range of a known data set obtained in advance through experiments or the like.

In addition, when creating a response curved surface of the process data (deposition amount, film formation rate) for the process conditions in the substrate processing apparatus 1, not only the actually-measured values but also the process data estimated by the process estimation system 100 may be added. As a result, since it is possible to estimate the process data under the process conditions between the actually-measured values, it is possible to increase the number of data on the response curved surface. In addition, it is possible to reduce the number of actual measurement steps.

In the substrate processing apparatus 1, when processing a subsequent substrate W after processing one substrate W, the process estimation system 100 may take over, as an initial value of a virtual sensor, the final virtual sensor data at the time of processing the one substrate W. For example, in the virtual temperature sensor that detects a temperature of a component (the shower head 23) of the substrate processing apparatus 1, a previous value may be taken over. In addition, a temperature of a replaced substrate W and a temperature and pressure of a gas that is sequentially supplied into the processing space 21 do not have to be taken over. Furthermore, the process estimation system 100 may take over a cumulative value (cumulative film thickness) of the process data based on the process data (film thickness) in the substrate processing apparatus 1. For example, when a film is formed on the substrate W, the film is also formed on an inner wall surface of the chamber 2. This film will be accumulated until it is removed by a cleaning process or the like. As a result, for example, in the physical model 121 illustrated in FIG. 3, the heat transfer quantity changes. By taking over the cumulative value (cumulative film thickness) of the process data, the process estimation system 100 is capable of appropriately generating the virtual sensor data and estimating the process data in consideration of the state of the inner wall surface of the chamber 2.

Figure 7:
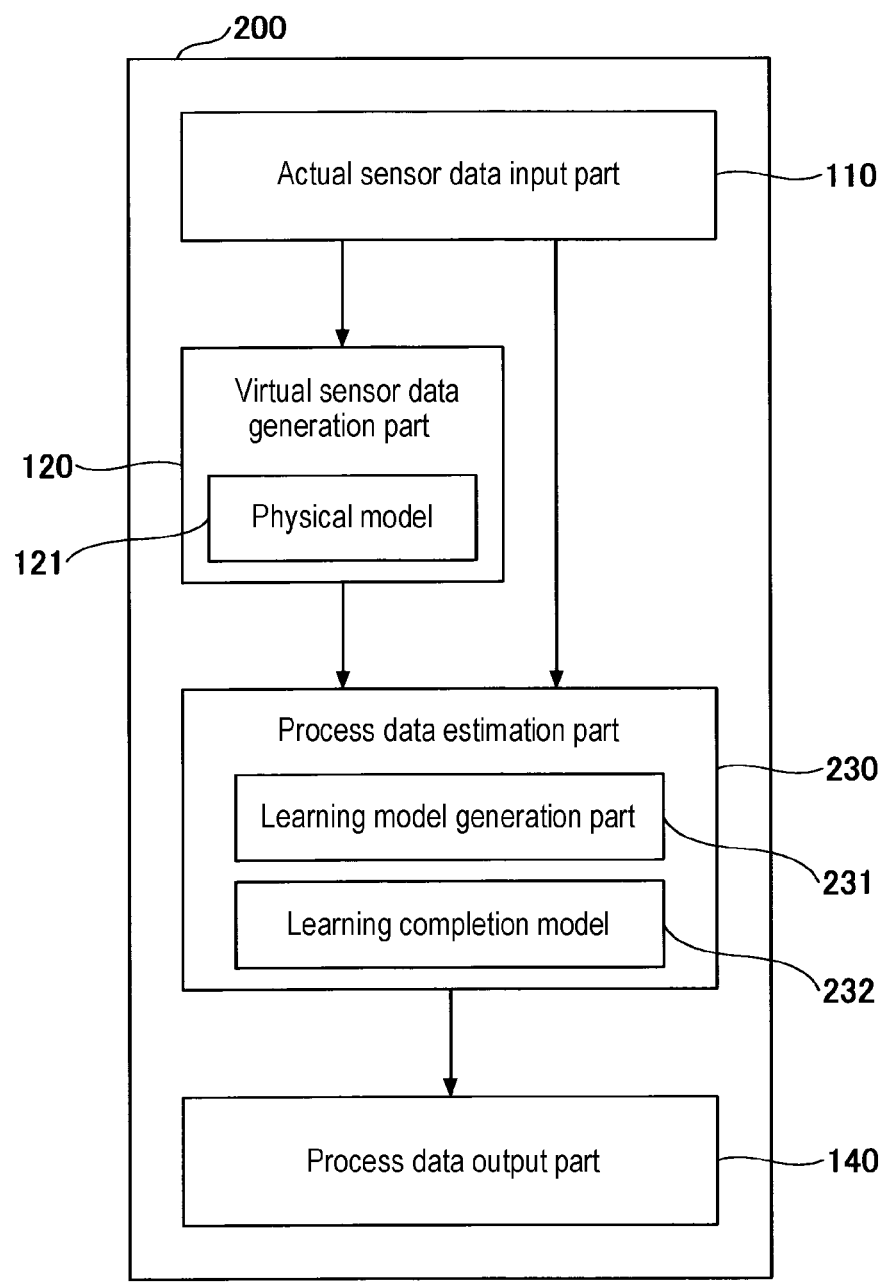
FIG. 7 is a configuration view illustrating an example of a process estimation system according to a second embodiment.

Next, a process estimation system 200 according to a second embodiment will be described with reference to FIG. 7. FIG. 7 is a configuration view illustrating an example of the process estimation system 200 according to the second embodiment. The process estimation system 200 estimates process data based on the detection values of respective sensors S1 to S4 of the substrate processing apparatus 1.

The process estimation system 200 includes an actual sensor data input part 110, a virtual sensor data generation part 120, a process data estimation part 230, and a process data output part 140.

The process data estimation part 230 includes a learning model generation part 231. Here, a data set of known actual sensor data and process data is input to the process estimation system 200. The virtual sensor data generation part 120 generates virtual sensor data in the data set. The learning model generation part 231 performs a machine learning using a data set of virtual sensor data (and real sensor data) and process data as teacher data, and generates a learning completion model 232.

As a result, the process estimation system 200 generates the virtual sensor data with the virtual sensor data generation part 120 when the actual sensor data is input. Then, the process data estimation part 230 estimates the process data based on the virtual sensor data (and the actual sensor data) and the learning completion model 232.

As described above, the process estimation system 200 according to the second embodiment generates the learning completion model 232 by using the data set of the virtual sensor data (and the actual sensor data) and the process data as the teacher data, and estimates the process data based on the generated learning completion model 232. Here, since it is possible to use the virtual sensor data having a high correlation with the process data as the virtual sensor data used as the teacher data, it is possible to improve the estimation accuracy of the process data by the learning completion model 232.

Figure 8:
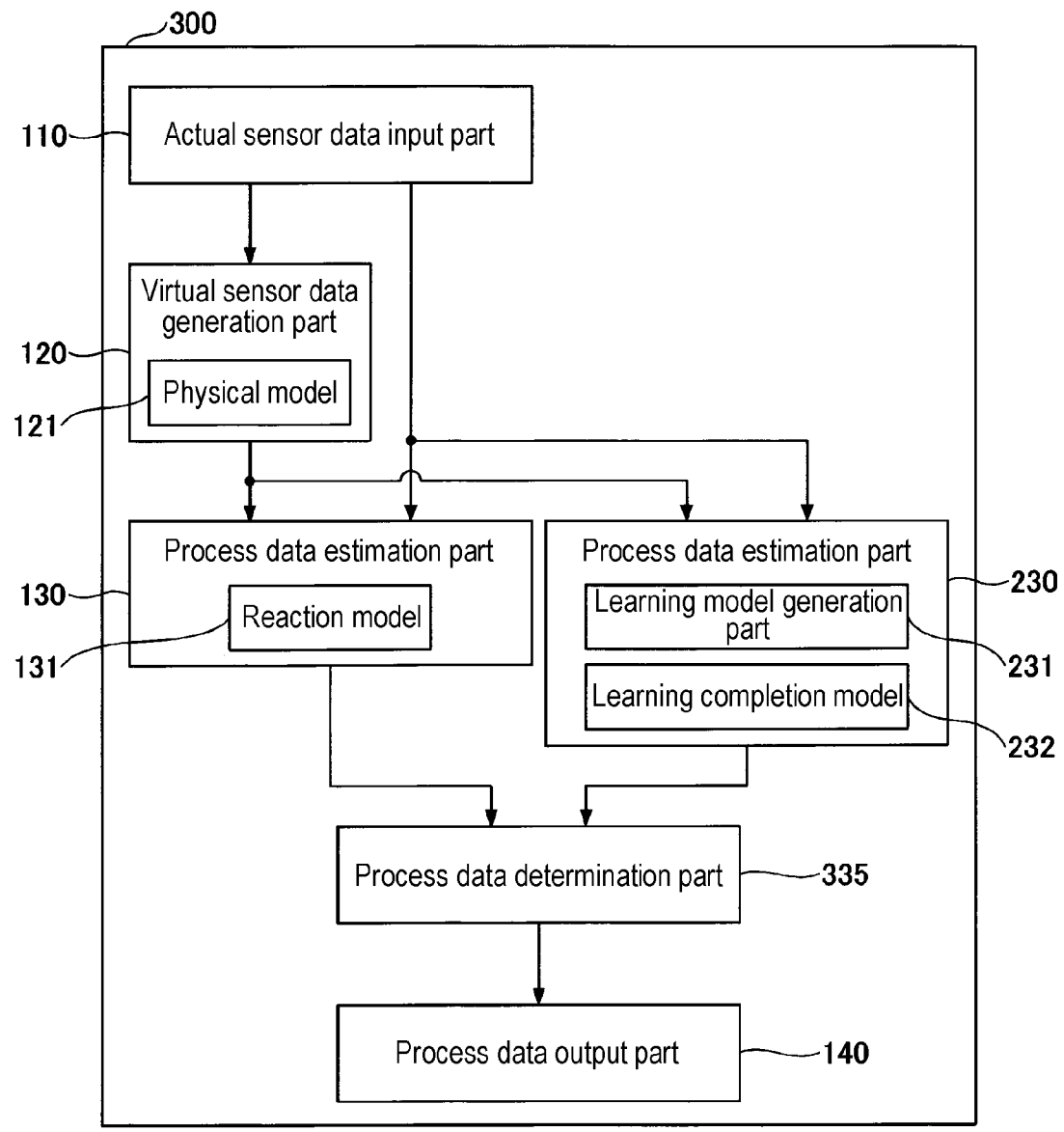
FIG. 8 is a configuration view illustrating an example of a process estimation system according to a third embodiment.

Next, a process estimation system 300 according to a third embodiment will be described with reference to FIG. 8. FIG. 8 is a configuration view illustrating an example of the process estimation system 300 according to the third embodiment. The process estimation system 300 estimates process data based on the detection values of respective sensors S1 to S4 of the substrate processing apparatus 1.

The process estimation system 300 includes an actual sensor data input part 110, a virtual sensor data generation part 120, process data estimation parts 130 and 230, a process data determination part 335, and a process data output part 140.

The process estimation system 300 generates virtual sensor data with the virtual sensor data generation part 120 when the actual sensor data is input. Then, the process data estimation part 130 estimates the process data based on the virtual sensor data (and the actual sensor data) and the reaction model 131. In addition, the process data estimation part 230 estimates the process data based on the virtual sensor data (and the actual sensor data) and the learning completion model 232.

The process data determination part 335 determines the process data based on the process data estimated by the process data estimation part 130 and the process data estimated by the process data estimation part 230. For example, the process data determination part 335 determines, as the process data, an average value of the process data estimated by the process data estimation part 130 and the process data estimated by the process data estimation part 230.

As described above, with the process estimation system 300 according to the third embodiment, since it is possible to determine final process data based on the process data estimated by the plurality of process data estimation parts 130 and 230, it is possible to improve the estimation accuracy of the process data.

The process estimation systems 100 to 300 of the substrate processing apparatus 1 according to the present embodiment have been described above, but the present disclosure is not limited thereto.

The substrate processing apparatus 1 is applicable to various substrate processing apparatuses such as a thermal CVD apparatus, a plasma CVD apparatus, a thermal ALD apparatus, and a plasma ALD apparatus.

The actual sensor data input to the actual sensor data input part 110 has been described as being the detection value of the temperature sensor S1, the detection value of the temperature sensor S2, the detection value of the flow sensor S3, and the detection value of the pressure sensor S4, but is not limited thereto. The actual sensor data may include detection values of sensors (a voltage sensor, a current sensor, an emission spectroscopic analyzer, and the like) provided in the substrate processing apparatus 1.

In addition, the virtual sensor data generated by the virtual sensor data generation part 120 has been described as being the temperature of the substrate W, the temperature of the shower head 23, the temperature of the gas inside the processing space 21, and the pressure of the gas inside the processing space 21, but is not limited thereto. The virtual sensor data may include an ion concentration, electron density, electron temperature, radical concentration, or self-bias value of plasma generated inside the processing space 21.

The process data has been described as being the film formation amount (film formation rate), but is not limited to this. For example, the process data may be a step covering property (coverage) of film formation. In addition, when the substrate processing apparatus 1 is an etching apparatus that performs an etching process on the substrate W, the process data may be an etching amount (etching rate). Furthermore, the process data may be the number of particles or the number of defects of the substrate W after processing regardless of the processing content of the substrate processing apparatus 1.

The present application claims priority based on Japanese Patent Application No. 2020-20129 filed on Feb. 7, 2020, the disclosure of which is incorporated herein in its entirety by reference.

EXPLANATION OF REFERENCE NUMERALS

1: substrate processing apparatus, 2: chamber, 3: stage, 4: gas supply device, 5 exhaust device, 6: control device, 7: gas, 21: processing space, 22: exhaust space, 23: shower head, 41: gas source, 42: mass flow controller, 43: opening/closing valve, 100: process estimation system, 110: actual sensor data input part, 120: virtual sensor data generation part, 121: physical model, 130 process data estimation part, 131: reaction model, 132: gas phase reaction model, 133: surface reaction model, 134: process data, 140: process data output part, 200: process estimation system, 230: process data estimation part, 231: learning model generation part,

232: learning completion model, 300: process estimation system, 335: process data determination part

What is claimed is:

1. A process estimation system comprising:
    an input part configured to input actual sensor data detected by a sensor of a substrate processing apparatus;
    a virtual sensor data generation part configured to generate virtual sensor data for a virtual sensor based on the actual sensor data and a physical model; and
    a process data estimation part configured to estimate process data based on the virtual sensor data and a reaction model,
    wherein the reaction model comprises:
    a gas phase reaction model configured to estimate a decomposition amount of a precursor gas inside a processing space based on virtual sensor data of a gas pressure and virtual sensor data of a gas temperature inside the processing space; and
    a surface reaction model configured to estimate an adsorption amount of the precursor gas adsorbed on a surface of a substrate as the process data, based on the decomposition amount of the precursor gas estimated by the gas phase reaction model and virtual sensor data of a temperature of the substrate.

2. The process estimation system of claim 1, wherein the process data estimation part is configured to estimate the process data based on the actual sensor data, the virtual sensor data and the reaction model.

3. The process estimation system of claim 2, wherein the sensor includes at least one of a temperature sensor, a gas flow rate sensor, a pressure sensor, a voltage sensor, a current sensor, and an emission spectroscopic analyzer.

4. The process estimation system of claim 3, wherein the physical model is a thermo-fluid model.

5. The process estimation system of claim 4, wherein the substrate processing apparatus is a film forming apparatus that performs a film forming process on the substrate, and
    the process data is a thickness of a film formed on the substrate.

6. The process estimation system of claim 5, wherein the process data estimation part includes a machine learning part configured to perform a machine learning and generate a learned model by using a data set of the virtual sensor data and the process data as teacher data.

7. The process estimation system of claim 6, wherein the process data estimation part is configured to estimate the process data based on the virtual sensor data and the learned model.

8. The process estimation system of claim 1, wherein the sensor includes at least one of a temperature sensor, a gas flow rate sensor, a pressure sensor, a voltage sensor, a current sensor, and an emission spectroscopic analyzer.

9. The process estimation system of claim 1, wherein the physical model is a thermo-fluid model.

10. The process estimation system of claim 1, wherein the substrate processing apparatus is a film forming apparatus that performs a film forming process on the substrate, and
    the process data is a thickness of a film formed on the substrate.

11. The process estimation system of claim 1, wherein the process data estimation part includes a machine learning part configured to perform a machine learning and generate a learned model by using a data set of the virtual sensor data and the process data as teacher data.

12. A process data estimation method of estimating process data of a substrate processing apparatus, the process data estimation method comprising:
    inputting actual sensor data detected by a sensor of the substrate processing apparatus;
    generating virtual sensor data for a virtual sensor based on the actual sensor data and a physical model; and
    estimating process data based on the virtual sensor data and a reaction model,
    wherein the reaction model comprises:
    a gas phase reaction model configured to estimate a decomposition amount of a precursor gas inside a processing space based on virtual sensor data of a gas pressure and virtual sensor data of a gas temperature inside the processing space; and
    a surface reaction model configured to estimate an adsorption amount of the precursor gas adsorbed on a surface of a substrate as the process data, based on the decomposition amount of the precursor gas estimated by the gas phase reaction model and virtual sensor data of a temperature of the substrate.

13. A non-transitory computer-readable recording medium that causes a computer to execute the process data estimation method of claim 12.

* * * * *